(12) United States Patent
Gao et al.

(10) Patent No.: US 9,918,285 B2
(45) Date of Patent: Mar. 13, 2018

(54) METHOD AND USER EQUIPMENT OF UPLINK POWER CONTROL

(71) Applicant: CHINA ACADEMY OF TELECOMMUNICATIONS TECHNOLOGY, Beijing (CN)

(72) Inventors: Xuejuan Gao, Beijing (CN); Yanan Lin, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 168 days.

(21) Appl. No.: 14/388,794

(22) PCT Filed: Mar. 6, 2013

(86) PCT No.: PCT/CN2013/072260
§ 371 (c)(1),
(2) Date: Sep. 26, 2014

(87) PCT Pub. No.: WO2013/143382
PCT Pub. Date: Oct. 3, 2013

(65) Prior Publication Data
US 2015/0063245 A1    Mar. 5, 2015

(30) Foreign Application Priority Data
Mar. 26, 2012   (CN) .......................... 2012 1 0082455

(51) Int. Cl.
*H04W 4/00* (2009.01)
*H04W 52/24* (2009.01)
(Continued)

(52) U.S. Cl.
CPC ....... *H04W 52/248* (2013.01); *H04W 52/346* (2013.01); *H04W 52/367* (2013.01);
(Continued)

(58) Field of Classification Search
CPC .................................................. H04W 52/248
See application file for complete search history.

(56) References Cited

U.S. PATENT DOCUMENTS

2007/0115872 A1    5/2007  Kim et al.
2010/0311428 A1*  12/2010  Zhang ................ H04J 13/0062
                                                          455/447
(Continued)

FOREIGN PATENT DOCUMENTS

CN        101119146 A      2/2008
CN        102238716 A      11/2011
(Continued)

OTHER PUBLICATIONS

PCT International Search Report for PCT Counterpart Application No. PCT/CN2013/072260, 5 pages. (including English translation), (dated Jun. 13, 2013).
(Continued)

*Primary Examiner* — Huy D Vu
*Assistant Examiner* — Kevin Cunningham
(74) *Attorney, Agent, or Firm* — Womble Bond Dickinson (US) LLP

(57) ABSTRACT

Disclosed are a method and user equipment of uplink power control. The method comprises the steps of: UE determines the target transmission power of uplink signal which transmitted on each synchronization uplink component carrier of current uplink sub-frame; Judging whether PRACH transmission exists on uplink secondary component carrier of current uplink sub-frame; If judged that there is, determining the PRACH target transmission power, and further judging that whether the sum of the uplink signal power and the PRACH target transmission power exceeds the maximum transmission power of UE; If judged exceeded, holding the PRACH target transmission power constant, and reducing the target transmission power of all or part of SC-FDMA
(Continued)

symbol of uplink signal which is contained in current uplink sub-frame and needed to reduce power. The technical scheme of present invention is using for uplink power control when PRACH signal is overlap with other uplink signal.

14 Claims, 6 Drawing Sheets

(51) Int. Cl.
*H04W 52/34* (2009.01)
*H04W 52/36* (2009.01)
*H04W 52/50* (2009.01)
*H04W 52/14* (2009.01)
*H04W 52/32* (2009.01)

(52) U.S. Cl.
CPC .......... *H04W 52/50* (2013.01); *H04W 52/146* (2013.01); *H04W 52/325* (2013.01); *H04W 52/34* (2013.01)

(56) References Cited

U.S. PATENT DOCUMENTS

| | | | |
|---|---|---|---|
| 2011/0081927 A1* | 4/2011 | Gerstenberger | H04W 52/10 455/506 |
| 2011/0287804 A1* | 11/2011 | Seo | H04W 52/146 455/522 |
| 2012/0188947 A1* | 7/2012 | Larsson | H04W 52/146 370/328 |
| 2013/0058315 A1* | 3/2013 | Feuersanger | H04W 52/281 370/336 |

FOREIGN PATENT DOCUMENTS

| | | |
|---|---|---|
| CN | 102378341 A | 3/2012 |
| WO | WO 2011/120716 A1 | 10/2011 |

OTHER PUBLICATIONS

PCT Written Opinion of the International Searching Authority for PCT Counterpart Application No. PCT/CN2013/072260, 14 pages (including English translation), (dated Jun. 13, 2013).

Catt, "UL power control with multiple timimg advances in Rel-11", XP50562673A, 3GPP TSG RAN WG1 Meeting #68, R1-120093, Dresden, Germany, 4 pages, (Feb. 6-10, 2012).

Alcatel-Lucent, Alcatel-Lucent Shanghai Bell, "Power scaling for simultaneous transmissions of multiple UL channels with multiple TA groups", XP50563320A, 3GPP TSG RAN WG1 Meeting #68, R1-120486, Dresden, Germany, 4 pages, (Feb. 6-10, 2012).

PCT Notification Concerning Transmittal of International Preliminary Report on Patentability (Chapter I of the Patent Cooperation Treaty) for PCT Counterpart Application No. PCT/CN2013/072260, 17 pp. (including English translation), (dated Oct. 9, 2014).

Office Action for corresponding Korean Patent Application No. 10-2014-7029728, 7 pp., (dated Jul. 3, 2015).

ZTE, "Consideration on Issues Related to Multiple TA", 3GPP TSG RAN WG1 Meeting #68, R1-120286, Dresden, Germany, 7 pp., (dated Feb. 6-10, 2012).

\* cited by examiner

-- Prior Art --

-- Prior Art --

METHOD AND USER EQUIPMENT OF UPLINK POWER CONTROL

CROSS-REFERENCE TO RELATED APPLICATIONS

This patent application is a U.S. National Stage Application under 35 U.S.C. § 371 of International Application No. PCT/CN2013/072260, filed on Mar. 6, 2013, entitled METHOD AND USER EQUIPMENT OF UPLINK POWER CONTROL, designating the United States, and claiming priority from Chinese Patent Application No. 201210082455.3, filed with the Chinese Patent Office on Mar. 26, 2012, and entitled "Uplink power control method and user equipment", which was incorporated by reference in its entirety.

FIELD OF THE INVENTION

The present invention relates to the field of communications and particularly to an uplink power control method and a user equipment.

BACKGROUND OF THE INVENTION

In the LTE-A (Long Term Evolution-Advanced) Rel-10 (Release-10), only intra-band CA (Carrier Aggregation) is supported in the uplink, and transmission characteristics of radio signals on respective carriers are similar, so uplink transmission timings of the respective carriers are adjusted based on a TA (Time Advance) obtained in the RA (Random Access) procedure on the PCC (Primary Component Carrier), that is, the uplink transmission timings of multiple carriers are aligned, so that such a situation will not occur that an uplink signal in a current uplink sub-frame overlaps in transmission with an uplink signal in an adjacent uplink sub-frame. Since the same TA is used for all the uplink carriers in the uplink sub-frames, uplink out-of-synchronization of the PCC will cause uplink out-of-synchronization of other carriers, and at this time a UE (User Equipment) will obtain a new TA in the RA procedure on the PCC. In this procedure, a PUCCH (Physical Uplink Control Channel), a PUSCH (Physical Uplink Shared Channel), an SRS (Sounding Reference Signal) and other uplink signals will not be transmitted, so a PRACH (Physical Random Access Channel) will not be transmitted concurrently with the PUCCH, the PUSCH, the SRS or other uplink signals.

The PRACH is used to carry a random access preamble sequence so as to obtain the TA value, and as illustrated in FIG. 1, the preamble sequence is consisted of a CP (Cyclic Prefix) and a sequence, where the length of the CP is $T_{CP}$, and the length of the sequence is $T_{SEQ}$. A GT (Guard Time) is reserved at the end of the PRACH, and the structure of the PRACH is as illustrated in FIG. 2, where the length of the PRACH is the duration of one TTI (Transmission Time Interval). The CP and the GT are used to avoid interference between the PRACH and a previous or succeeding uplink sub-frame, and the values of the CP and the GT reflect the maximal RTD (Round Trip Delay) decided by the cell size and the maximal channel delay spread.

In order to support coverage of different cells, five preamble formats are defined in the LTE system, and their particular parameters are as depicted in Table 1.

TABLE 1

| Preamble format | $T_{CP}$ | $T_{SEQ}$ | Number K of sub-frames occupied by PRACH |
|---|---|---|---|
| 0 (normal format) for a cell radius of approximately 15 km | $3168 \cdot T_S$ | $24576 \cdot T_S$ | 1 |
| 1 (a long CP) for a cell radius of approximately 30 to 100 km (exclusive) | $21024 \cdot T_S$ | $24576 \cdot T_S$ | 2 |
| 2 (a short CP and a repeated preamble sequence) for a cell radius of approximately 30 km | $6240 \cdot T_S$ | $2 \cdot 24576 \cdot T_S$ | 2 |
| 3 (a long CP and a repeated preamble sequence) for a cell radius of approximately 100 km | $21024 \cdot T_S$ | $2 \cdot 24576 \cdot T_S$ | 3 |
| 4 (only applicable to a TDD system) for a hotspot area | $448 \cdot T_S$ | $4096 \cdot T_S$ | TDD special sub-frames UpPTS |

$T_s$ represents a system sample interval of a carrier on which the preamble sequence is transmitted, where $T_s=1/30720$ ms (millisecond). The format 4 is specific to the TDD (Time Division Duplexing) system and is used for a hotspot area with the radius of approximately 2 kilometers and transmitted only in an UpPTS (Uplink Pilot Time Slot) configured with two SC-FDMA (Single Carrier-Frequency Division Multiple Access) symbols starting at $4832\,T_s$ ahead of the end of an UpPTS sub-frame. The configuration of each carrier is decided by the higher layer. The PRACH with the transmission length of more than 1 ms typically occupies the consecutive uplink sub-frames for transmission.

In the LTE-A Rel-10, target transmit power $P_{PUCCH}(i)$ of the PUCCH transmitted on the PCC in an uplink sub-frame i, target transmit power $P_{PRACH}(i)$ of the PRACH transmitted on the PCC, target transmit power $P_{PUSCH,c}(i)$ of the PUSCH transmitted on each carrier and target transmit power $P_{SRS,c}(i)$ of the SRS transmitted on each carrier are defined for a CA UE, where c represents the carrier index, and i represents the sub-frame.

In the LTE-A Rel-10, concurrent transmission of the PUCCH and the PUSCH on the same carrier or different carriers is supported in the same uplink sub-frame, and concurrent transmission of the PUSCHs on different carriers is supported in the same uplink sub-frame. If the total transmit power of the UE in the current uplink sub-frame i would exceed the allowed maximum transmit power of the UE, then transmit power of the uplink signals in the uplink sub-frame need to be scaled by the same scaling factor according to the priorities of the uplink signals, that is, the uplink transmit power of the UE is controlled in such a way that the same power scaling factor applies to uplink signals with the same priority of the uplink signals. During the power scaling, the UE preferentially ensures not to scale down the target transmit power of the PUCCH, and firstly scales down the target transmit power of the PUSCH on each carrier c, so that the sum of the transmit power of all the uplink signals after power scaling does not exceed the allowed maximum transmit power $P_{CMAX}(i)$ of the UE, that is:

$$\sum_c w(i) \cdot \hat{P}_{PUSCH,c}(i) \leq (\hat{P}_{CMAX}(i) - \hat{P}_{PUCCH}(i))$$

$\hat{P}_{PUSCH,c}(i)$ represents a linear-domain value of $P_{PUSCH,c}(i)$, $\hat{P}_{PUCCH}(i)$ represents a linear-domain value of $P_{PUCCH}(i)$, $\hat{P}_{CMAX}(i)$ represents a linear-domain value of $P_{CMAX}(i)$, and w(i) represents a power scaling factor for the carrier c where 0≤w(i)≤1. If no PUCCH is transmitted in the current uplink sub-frame i, then $\hat{P}_{PUCCH,c}(i)=0$. Moreover when the UE performs uplink power control, the power scaling factor w(i) can be determined firstly if the target transmit power of the PUSCHs needs to be scaled down, and preferably the determined power scaling factor w(i) meets the following condition: the sum of the transmit power of all the uplink signals does not exceed the allowed maximum transmit power $P_{CMAX}(i)$ of the UE after the target transmit power of the PUSCHs are scaled down. Then the UE scales down the target transmit power of the PUSCHs according to the determined w(i).

If the PUSCHs of the UE in the current uplink sub-frame i include a PUSCH with UCI (Uplink Control Information) and PUSCH(s) without UCI and the total transmit power of the UE would exceed the allowed maximum transmit power of the UE, then the UE preferentially ensures not to scale down the target transmit power of the PUSCH with UCI, and scales down the target transmit power of the PUSCH(s) without UCI on each carrier by the same scaling factor, so that the sum of the transmit power of all the uplink signals after power scaling does not exceed the allowed maximum transmit power of the UE, that is:

$$\hat{P}_{PUSCH,j}(i) = \min(\hat{P}_{PUSCH,j}(i), (\hat{P}_{CMAX}(i) - \hat{P}_{PUCCH}(i)))$$

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

If the total transmit power of the UE still would exceed the allowed maximum transmit power of the UE when the transmit power of all the PUSCHs without UCI is scaled down to zero, then the transmit power of the PUSCH with UCI can be further scaled down.

In the LTE-A Rel-11, CA across different frequency bands in the uplink and a hybrid CA deployment of a macro base station and an RRH (Remote Radio Head) can be supported. Since transmission characteristics and transmission paths of radio signals in the different frequency bands may be different, there may be different uplink transmission delays so that signals on different carriers transmitted in the same uplink sub-frame may arrive at the base station at different times. Therefore the uplink transmission timing of the different carriers may be adjusted by using different TAs in the Rel-11. In view of this, the concept of a TA group has been introduced to the LTE-A Rel-11, where carriers with the same or similar transmission delays are considered as one group and referred to as a TA group, the same TA applies to carriers in the same TA group, and a TA value corresponding to the TA group is obtained in the RA procedure on one of carriers in the TA group. When uplink out-of-synchronization of a TA group occurs, the uplink synchronization will be achieved by the RA procedure on a predetermined carrier in the TA group. For a TA group including the PCC, the PCC is the carrier on which the RA procedure is performed, and for a TA group including only SCCs (Secondary Component Carriers), one of the SCCs can be selected for the RA procedure, so the PRACH transmission on an SCC is supported in the LTE-A Rel-11, and at present it is determined that concurrent transmission of PRACHs on multiple carriers in an uplink sub-frame is not supported.

When a PRACH is transmitted on an SCC in a TA group in uplink out-of-synchronization, a PUCCH/PUSCH or another uplink signal may be transmitted on one or more uplink carriers in another TA group in uplink synchronization, so concurrent transmission of the PRACH and the PUCCH/PUSCH needs to be supported in the LTE-A Rel-11. In view of misalignment of uplink transmission timing of the PRACH and the PUCCH/PUSCH in the same uplink sub-frame and possible continuous transmission of the PRACH (e.g., in the preamble formats 1, 2 and 3) across multiple uplink sub-frames, the PUCCH/PUSCH in the uplink sub-frame where it is located may overlap in transmission with the PRACH in all or a part of SC-FDMA symbols. At present there is no particular solution of performing uplink power control in the case that the PRACH overlaps in transmission with the PUCCH/PUSCH to ensure the total transmit power of the respective uplink signals not to exceed the allowed maximum transmit power of the UE in the prior art.

SUMMARY OF THE INVENTION

Embodiments of the invention provide an uplink power control method and a user equipment so as to perform uplink power control in the case that a PRACH overlaps in transmission with other uplink signals.

Technical solutions according to the embodiments of the invention are as follows:

An uplink power control method includes: a User Equipment (UE) determining target transmit power of uplink signals transmitted on respective synchronized uplink component carriers in a current uplink sub-frame; judging whether a Physical Random Access Channel (PRACH) is transmitted on an uplink secondary component carrier in the current uplink sub-frame; if so, then determining target transmit power of the PRACH and further judging whether a sum of the target transmit power of the uplink signals and the target transmit power of the PRACH would exceed maximum transmit power of the UE; if so, then maintaining the target transmit power of the PRACH unchanged, and scaling down target transmit power of all or a part of Single Carrier-Frequency Division Multiple Access (SC-FDMA) symbols of the uplink signal required to be power scaled-down among the uplink signals in the current uplink sub-frame until a sum of transmit power of the uplink signals in the current uplink sub-frame does not exceed the maximum transmit power of the UE minus the target transmit power of the PRACH.

A User Equipment (UE) includes: a first transmit power determination unit configured to determine target transmit power of uplink signals transmitted on respective synchronized uplink component carriers in a current uplink sub-frame; a channel judgment unit configured to judge whether a Physical Random Access Channel (PRACH) is transmitted on an uplink secondary component carrier in the current uplink sub-frame; a second transmit power determination unit configured to determine target transmit power of the PRACH when the channel judgment unit judges that the PRACH is transmitted on the uplink secondary component carrier in the current uplink sub-frame; a transmit power judgment unit configured to judge whether a sum of the target transmit power of the uplink signals and the target transmit power of the PRACH would exceed maximum transmit power of the UE; and a power control unit configured to maintain the target transmit power of the PRACH unchanged, and to scale down target transmit power of all or a part of Single Carrier-Frequency Division Multiple Access (SC-FDMA) symbols of an uplink signal required to be power scaled-down among the uplink signals in the current uplink sub-frame until a sum of transmit power of the uplink signals in the current uplink sub-frame does not exceed the maximum transmit power of the UE minus the target transmit power of the PRACH when the transmit power judgment unit judges that the sum of the target transmit power of the uplink signals and the target transmit power of the PRACH would exceed the maximum transmit power of the UE.

In the technical solution according to the embodiments of the invention, the UE determines target transmit power of uplink signals transmitted on respective synchronized uplink component carriers in a current uplink sub-frame, and judges whether a PRACH is transmitted on an uplink secondary component carrier in the current uplink sub-frame, and if so, then it indicates such a situation that the PRACH overlaps in transmission with the uplink signals occurs, and at this time the UE can determine the target transmit power of the PRACH and further judge whether the sum of the target transmit power of the uplink signals and the target transmit power of the PRACH would exceed the maximum transmit power of the UE, and if so, then the UE maintains the target transmit power of the PRACH unchanged and scales down the target transmit power of all or a part of SC-FDMA symbols of an uplink signal required to be power scaled among the uplink signals in the current uplink sub-frame until the sum of the transmit power of the uplink signals in the current uplink sub-frame does not exceed the maximum transmit power of the UE minus the target transmit power of the PRACH. As can be apparent, the technical solution according to the embodiments of the invention proposes a particular implementation solution of performing uplink power control in the case that the PRACH overlaps in transmission with another uplink signal so as to ensure the normal operation of the UE.

DETAILED DESCRIPTION OF THE EMBODIMENTS

The general implementation principle and particular implementations of the technical solution according to the embodiments of the application as well as the corresponding achievable advantageous effects will be described below in details with reference to the respective drawings.

First Embodiment

Figure 1:
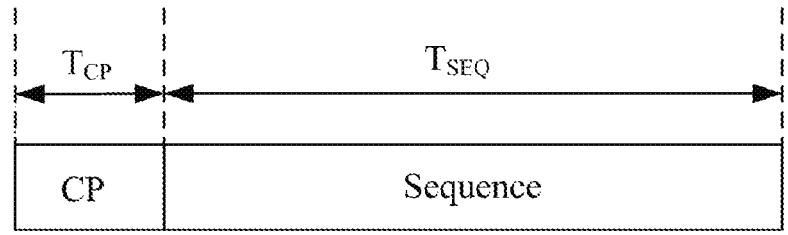
FIG. 1 is a schematic structural diagram of a preamble sequence in the prior art.
Figure 2:
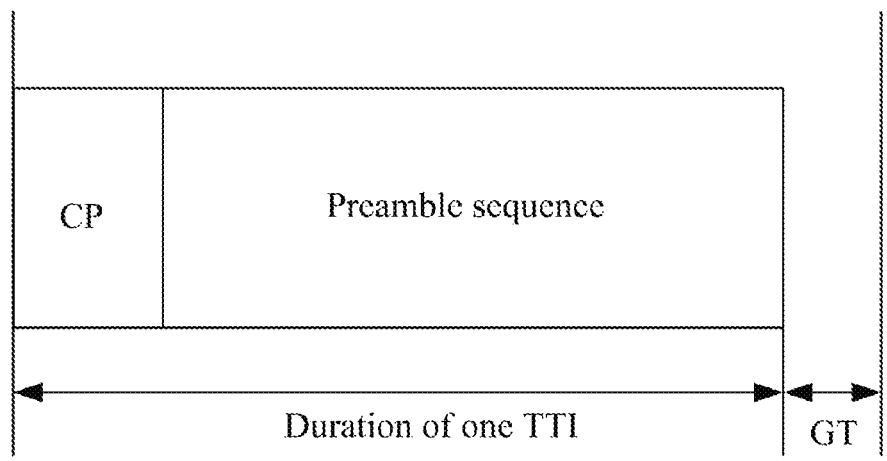
FIG. 2 is a schematic structural diagram of a PRACH in the prior art.
Figure 3:
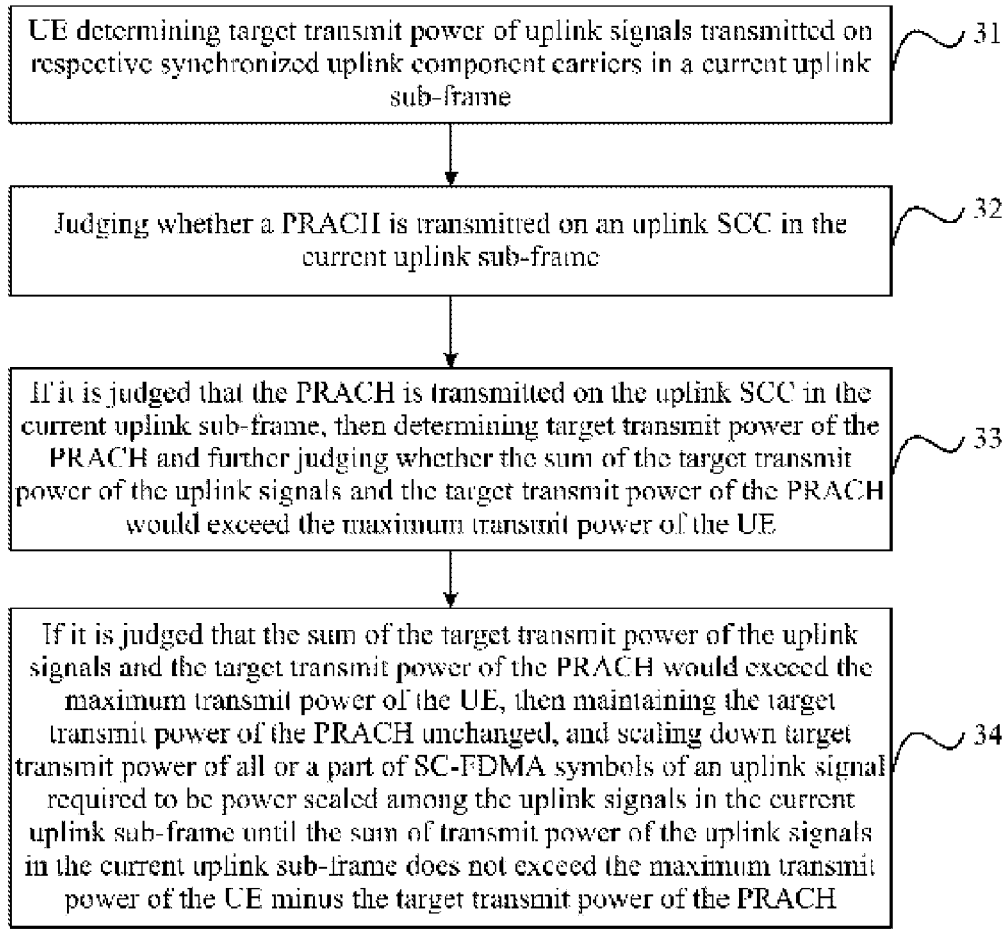
FIG. 3 is a schematic flow chart of an uplink power control method according to a first embodiment of the invention.

FIG. 3 illustrates a flow chart of an uplink power control method according to the first embodiment of the invention, and the particular process flow thereof is as follows:

Step 31: a UE determining target transmit power of uplink signals transmitted on respective synchronized uplink component carriers in a current uplink sub-frame.

The uplink signals can include, but not be limited to, at least one of the following signals: a PUSCH, a PUCCH and an SRS.

Step 32: judging whether a PRACH is transmitted on an uplink SCC in the current uplink sub-frame.

In the LTE-A Rel-11, since transmission characteristics and transmission paths of radio signals in the different frequency bands may be different, there may be different uplink transmission delays so that signals on different carriers transmitted in the same uplink sub-frame may arrive at the base station at different times. Therefore the uplink transmission timing of the different carriers may be adjusted by using different TAs. In view of this, carriers with the same or similar transmission delays are considered as one group and referred to as a TA group, the same TA applies to carriers in the same TA group, and a TA value corresponding to the TA group is obtained in the RA procedure on one of carriers in the TA group. When uplink out-of-synchronization of a TA group occurs, the uplink synchronization will be performed in the RA procedure on a predetermined carrier in the TA group to obtain a new TA value. For a TA group including the PCC, the PCC is the carrier on which the RA procedure is performed, and for a TA group including only SCCs, one of the SCCs can be selected for the RA procedure.

As can be apparent, if uplink out-of-synchronization of a TA group occurs, then the RA procedure will be triggered on a carrier in the TA group to obtain a new TA. If the TA group includes the PCC at this time, then the PCC will initiate the RA procedure, and no PUCCH/PUSCH/SRS or another uplink signal will be transmitted in the current uplink sub-frame during the RA procedure of the PCC, so such a situation will not occur that a PRACH overlaps in transmission with a PUCCH/PUSCH/SRS or another uplink signal in the current uplink sub-frame. If the TA group in uplink out-of-synchronization includes no PPC but only SCCs, then one of the SCCs will initiate the RA procedure, and at this time a PUCCH/PUSCH/SRS or another uplink signal may be transmitted concurrently on an uplink component carrier in another TA group in uplink synchronization, and then a PRACH may overlap in transmission with the PUCCH/PUSCH/SRS on all or a part of SC-FDMA symbols.

Step 33, if it is judged that the PRACH is transmitted on the uplink SCC in the current uplink sub-frame, then determining target transmit power of the PRACH and further judging whether the sum of the target transmit power of the uplink signals and the target transmit power of the PRACH would exceed the maximum transmit power of the UE.

If the UE judges that no PRACH is transmitted on any uplink SCC in the current uplink sub-frame, then the UE can perform uplink power control in the following two implementations without any limitation:

In a first implementation, the UE reuses the uplink power control scheme in the LTE-A Rel-10, and specifically, the UE judges whether the sum of the target transmit power of the uplink signals would exceed the maximum transmit power of the UE.

If it is judged that the sum of the target transmit power of the uplink signals would exceed the maximum transmit power of the UE, then it indicates that the UE needs to perform uplink power control at this time, and the UE can scale down the target transmit power of all the SC-FDMA symbols of an uplink signal required to be power scaled-down among the uplink signals in the current uplink sub-frame until the sum of the transmit power of the uplink signals in the current uplink sub-frame does not exceed the maximum transmit power of the UE.

Specifically, the uplink signal required to be power scaled is an uplink signal, with non-zero transmit power and the lowest priority, selected from the uplink signals in the current uplink sub-frame according to priorities of the uplink signals. When there are multiple uplink signal required to be power scaled, the power of multiple uplink signals is scaled down by the same scaling factor until the sum of the transmit power of the uplink signals in the current uplink sub-frame does not exceed the maximum transmit power of the UE; that is, as defined in the Rel-10, the uplink signal priority of a PUCCH is higher than that of a PUSCH with UCI, which is higher than that of a PUSCH without UCI, so firstly the power of the PUSCH without UCI is scaled down, and if the sum of the transmit power of the uplink signals in the current uplink sub-frame would still exceed the maximum transmit power of the UE when the transmit power of the PUSCH without UCI is scaled down to zero, then the transmit power of the PUSCH with UCI is further scaled down, and so on until the sum of the transmit power of the uplink signals in the current uplink sub-frame does not exceed the maximum transmit power of the UE. Particularly when concurrent transmission of an SRS in a TA group and a PUCCH/PUSCH in another TA group is supported, power control can be performed in a corresponding power control method for concurrent transmission of an SRS and a PUCCH/PUSCH in the case of multi-TA transmission.

If it is judged that the sum of the target transmit power of the uplink signals does not exceed the maximum transmit power of the UE, then it indicates that the UE does not need to perform uplink power control at this time, and the UE can transmit the uplink signals with the target transmit power of the uplink signals.

In a second implementation, although the PRACH transmitted concurrently with the PUCCH/PUSCH/SRS or another uplink signal is not transmitted in the current uplink sub-frame, but it may be transmitted in a previous adjacent uplink sub-frame of the current uplink sub-frame, and at this time the UE judges whether a PRACH is transmitted on an uplink SCC in a previous adjacent uplink sub-frame (which can further include a UpPTS in a TDD system) of the current uplink sub-frame, and if so, then the UE further judges whether the uplink signals in the current uplink sub-frame overlap with a preamble sequence carried in the PRACH in the previous adjacent uplink sub-frame.

If the UE judges that they do not overlap, then the UE further judges whether the sum of the target transmit power of the uplink signals would exceed the maximum transmit power of the UE, and if so, then it indicates that the UE needs to perform uplink power control at this time, and the UE can scale down the target transmit power of all the SC-FDMA symbols of an uplink signal required to be power scaled among the uplink signals in the current uplink sub-frame until the sum of the transmit power of the uplink signals in the current uplink sub-frame does not exceed the maximum transmit power of the UE, for example, by using the method described in the first implementation; otherwise, it indicates that the UE does not need to perform uplink power control at this time, and the UE can transmit the uplink signals with the target transmit power of the uplink signals.

If the UE judges that they overlap, then the UE determines the target transmit power of the PRACH in the previous adjacent uplink sub-frame and further judges whether the sum of the target transmit power of the uplink signals in the current uplink sub-frames and the target transmit power of the PRACH in the previous adjacent uplink sub-frame would exceed the maximum transmit power of the UE, and if so, then it indicates that the UE needs to perform uplink power control at this time, and the UE can maintain the target transmit power of the PRACH in the previous adjacent uplink sub-frame unchanged and scale down the target transmit power of all or a part of SC-FDMA symbols of an uplink signal required to be power scaled among the uplink signals in the current uplink sub-frame until the sum of the transmit power of the uplink signals in the current uplink sub-frame does not exceed the maximum transmit power of the UE minus the target transmit power of the PRACH; otherwise, it indicates that the UE does not need to perform uplink power control at this time, and the UE can transmit the uplink signals with the target transmit power of the uplink signals. Specifically, the particular process of judging whether the uplink signals in the current uplink sub-frame overlap with the preamble sequence carried in the PRACH in the previous adjacent uplink sub-frame are as follows:

If $TA_c \pm \Delta T_{D,c} \leq T_{GT}$ or $TA_c \pm \Delta T_{D,c} > T_{GT}$ and $\Delta T_{D,c} \leq T_{TP}$, then the UE judges that the uplink signals in the current uplink sub-frame do not overlap with (overlap only with the GT) the preamble sequence carried in the PRACH in the previous adjacent uplink sub-frame; otherwise, the UE judges that the uplink signals in the current uplink sub-frame overlap with the preamble sequence carried in the PRACH in the previous adjacent uplink sub-frame.

Specifically, when first SC-FDMA symbols are reserved in the uplink signals (that is, no information of the uplink signals in the current uplink sub-frame is transmitted in the first SC-FDMA symbols), the uplink signals in the current uplink sub-frame do not overlap with the preamble sequence carried in the PRACH in the previous adjacent uplink sub-frame either.

In the process described above, $TA_c$ represents a time advance of uplink transmission timing of a carrier on which an uplink signal required to be power scaled among the uplink signals in the current uplink sub-frame is transmitted, and c represents the index of the carrier on which the uplink signal is transmitted; $\Delta T_{D,c}$ represents the (absolute) difference in downlink reception timing between a carrier on which the PRACH is transmitted and the carrier c on which the uplink signal is transmitted, and is typically no more than 30 microseconds (simply μs), and in view that the error in transmission timing on a downlink carrier at the base station side is 1.3 μs at most, $\Delta T_{D,c}$ does not exceed 31.3 μs. $T_{GT}=K \cdot 1-(T_{CP}+T_{SEQ})$, where K represents the number of uplink sub-frames occupied by the preamble format corresponding to the preamble sequence, $T_{CP}$ represents the length of a CP in the preamble format, and $T_{SEQ}$ represents the length of a sequence in the preamble format. $T_{TP}$ represents the transient period defined at the initial transmission location of the uplink signal in the current uplink sub-frame, and $T_{TP}$ can be 20 μs or 40 μs or of course can be another defined value, and the first embodiment of the invention will not be limited in this regard.

In the step described above, when the UE judges that the uplink signals in the current uplink sub-frame overlap with the preamble sequence carried in the PRACH in the previous adjacent uplink sub-frame and the sum of the transmit power of the PRACH and the uplink signals would exceed the maximum transmit power of the UE, the UE can maintain the target transmit power of the PRACH in the previous adjacent uplink sub-frame unchanged and scale down the target transmit power of a part of the SC-FDMA symbols of the uplink signal required to be power scaled among the uplink signals in the current uplink sub-frame particularly as follows without any limitation:

For the uplink signal required to be power scaled among the uplink signals, the UE scales down the target transmit power of SC-FDMA symbols, overlapping with the preamble sequence carried in the PRACH, in the uplink signal in the current uplink sub-frame, or scales down the target transmit power of all the SC-FDMA symbols in a slot including SC-FDMA symbols, overlapping with the preamble sequence carried in the PRACH, in the uplink signal in the current uplink sub-frame; or If the uplink signals include at least two uplink signals and the sum of the target transmit power of the respective uplink signals does not exceed the maximum transmit power of the UE, then for the uplink signal required to be power scaled among the uplink signals, the UE scales down the target transmit power of SC-FDMA symbols, overlapping with the preamble sequence carried in the PRACH, in the uplink signal in the current uplink sub-frame, or scales down the target transmit power of all the SC-FDMA symbols in a slot (i.e., the first slot in the current uplink sub-frame) including SC-FDMA symbols, overlapping with the preamble sequence carried in the PRACH, in the uplink signal in the current uplink sub-frame; otherwise, for the uplink signal required to be power scaled among the uplink signals, the UE scales down the target transmit power of all the SC-FDMA symbols of the uplink signal in the current uplink sub-frame; or The first SC-FDMA symbols of the uplink signals in the current uplink sub-frame are removed (that is, the transmit power of the first SC-FDMA symbols is zero, where data in the first SC-FDMA symbols are not transmitted) to thereby avoid the preamble sequence carried in the PRACH in the previous adjacent uplink sub-frame from overlapping in transmission with the uplink signals in the current uplink sub-frame. This is because the preamble sequence carried in the PRACH in the previous adjacent uplink sub-frame overlaps with the uplink signals in the current uplink sub-frame by the time length $T_{overlap,c}$ which does not exceed one SC-FDMA symbol, where $T_{overlap,c} = (TA_c \pm \Delta T_{D,c}) - T_{GT} \leq \Delta T_{D,c}$.

Moreover if the UE judges that the uplink signals in the current uplink sub-frame overlap with the preamble sequence carried in the PRACH in the previous adjacent uplink sub-frame, then the UE can alternatively perform power control in five modes as described in the step 34 below.

It shall be noted that in the second implementation described above, when it is judged that the PRACH is transmitted in the previous adjacent uplink sub-frame of the current uplink sub-frame, the UE can perform power control directly in accordance with the power control implementation described above in the case that the uplink signals in the current uplink sub-frame overlap with the preamble sequence carried in the PRACH in the previous adjacent uplink sub-frame without judging whether they overlap with each other.

In the second implementation described above, if the reception timing of a downlink sub-frame corresponding to the uplink signals lags behind the reception timing of a downlink sub-frame corresponding to the PRACH, then "−" holds true for "±" in $TA_c \pm \Delta T_{D,c}$; otherwise, "+" holds true. In the first embodiment of the invention, if the PRACH is transmitted across multiple uplink sub-frames, then the transmit power of the PRACH in the respective uplink sub-frame is constant.

Step 34: if it is judged that the sum of the target transmit power of the uplink signals and the target transmit power of the PRACH would exceed the maximum transmit power of the UE, then maintaining the target transmit power of the PRACH unchanged, and scaling down target transmit power of all or a part of SC-FDMA symbols of an uplink signal required to be power scaled among the uplink signals in the current uplink sub-frame until the sum of transmit power of the uplink signals in the current uplink sub-frame does not exceed the maximum transmit power of the UE minus the target transmit power of the PRACH.

If the UE judges that the sum of the target transmit power of the uplink signals and the target transmit power of the PRACH does not exceed the maximum transmit power of the UE, then it indicates that the UE does not need to perform uplink power control at this time, and the UE can transmit with the target transmit power of the uplink signals and the target transmit power of the PRACH.

If the UE judges that the sum of the target transmit power of the uplink signals and the target transmit power of the PRACH would exceed the maximum transmit power of the UE, then it indicates that the UE needs to perform uplink power control at this time.

In the first embodiment of the invention, in the step 34, the UE needs to perform uplink power control by scaling down the target transmit power of all or a part of SC-FDMA symbols of the uplink signal required to be power scaled among the uplink signals in the current uplink sub-frame, that is, the UE can scale down the target transmit power of all the SC-FDMA symbols of the uplink signal or can scale down the target transmit power of a part of the SC-FDMA symbols of the uplink signal, and in the regard, the first embodiment of the invention proposes five particular implementation modes of uplink power control:

In a first mode, for the uplink signal required to be power scaled among the uplink signals, the UE scales down the target transmit power of all the SC-FDMA symbols of the uplink signal in the current uplink sub-frame.

In a second mode, for the uplink signal required to be power scaled among the uplink signals, the UE scales down the target transmit power of SC-FDMA symbols, overlapping with the preamble sequence carried in the PRACH, in the uplink signal in the current uplink sub-frame or scales down the target transmit power of all the SC-FDMA symbols in a slot including SC-FDMA symbols, overlapping with the preamble sequence carried in the PRACH, in the uplink signal in the current uplink sub-frame, where the overlapping SC-FDMA symbols include SC-FDMA symbols, overlapping with the preamble sequence carried in the PRACH in the current uplink sub-frame or a previous adjacent uplink sub-frame, in the uplink signal.

In a third mode, if the uplink signals transmitted on the respective synchronized uplink component carriers in the current uplink sub-frame include at least two uplink signals and the sum of the target transmit power of the respective uplink signals does not exceed the maximum transmit power of the UE, then for the uplink signal required to be power scaled among the uplink signals, the UE scales down the target transmit power of SC-FDMA symbols, overlapping with the preamble sequence carried in the PRACH, in the uplink signal in the current uplink sub-frame or scales down the target transmit power of all the SC-FDMA symbols in a slot including SC-FDMA symbols, overlapping with the preamble sequence carried in the PRACH, in the uplink signal in the current uplink sub-frame; otherwise, for the uplink signal required to be power scaled among the uplink signals, the UE scales down the target transmit power of all the SC-FDMA symbols of the uplink signal in the current uplink sub-frame, where the overlapping SC-FDMA symbols include SC-FDMA symbols, overlapping with the preamble sequence carried in the PRACH in the current uplink sub-frame or the previous adjacent uplink sub-frame, in the uplink signal.

In a fourth mode, for the uplink signal required to be power scaled among the uplink signals, the UE scales down the target transmit power of all or a part of SC-FDMA symbols of the uplink signal according to the number of SC-FDMA symbols, overlapping with the preamble sequence carried in the PRACH, in the uplink signal in the current uplink sub-frame or the transmission time length of the uplink signal, overlapping with the preamble sequence carried in the PRACH, in the current uplink sub-frame, where the overlapping SC-FDMA symbols or the overlapping transmission time include or includes SC-FDMA symbols or transmission time, overlapping with the preamble sequence carried in the PRACH in the current uplink sub-frame or a previous adjacent uplink sub-frame, in the uplink signal.

Here the fourth mode can further particularly include modes 4-1 and 4-2.

In the mode 4-1, the UE judges whether the number of the overlapping SC-FDMA symbols is not greater than a preset number N of SC-FDMA symbols or judges whether the overlapping transmission time is not greater than a preset time length threshold T, and if so, then the UE can scale down the target transmit power of the overlapping SC-FDMA symbols in the uplink signal in the current uplink sub-frame or scale down the target transmit power of all the SC-FDMA symbols in a slot including the overlapping SC-FDMA symbols in the uplink signal in the current uplink sub-frame; otherwise, the UE scales down the target transmit power of all the SC-FDMA symbols of the uplink signal in the current uplink sub-frame.

In the mode 4-2, if the uplink signals transmitted on the respective synchronized uplink component carriers in the current uplink sub-frame include at least two uplink signals and the sum of the target transmit power of the respective uplink signals would exceed the maximum transmit power of the UE, then the UE scales down the target transmit power of all the SC-FDMA symbols of an uplink signal required to be power scaled in the current uplink sub-frame; otherwise, For the uplink signal required to be power scaled among the uplink signals, the UE judges whether the number of the overlapping SC-FDMA symbols is not greater than a preset number N of SC-FDMA symbols or judges whether the overlapping transmission period of time is not greater than a preset time length threshold T, and if so, then the UE scales down the target transmit power of the overlapping SC-FDMA symbols in the uplink signal in the current uplink sub-frame or scales down the target transmit power of all the SC-FDMA symbols in a slot including the overlapping SC-FDMA symbols in the uplink signal in the current uplink sub-frame; otherwise, the UE scales down the target transmit power of all the SC-FDMA symbols of the uplink signal in the current uplink sub-frame.

Specifically, the overlapping SC-FDMA symbols described above include only those in which data is transmitted, and if there is one or more reserved SC-FDMA symbols in the uplink signals (PUCCH/PUSCH/SRS), then the reserved SC-FDMA symbols need to be removed from the overlapping SC-FDMA symbols (that is, these reserved SC-FDMA symbols are not included).

The number N of SC-FDMA symbols and the time length threshold T described above are preset values, for example, N is predefined as a value which does not exceed the number of SC-FDMA symbols in one slot, that is, $N \leq 7$ in case of a normal CP and $N \leq 6$ in case of an extended CP; and moreover T can be defined a value which does not exceed the length of one slot, for example $T \leq 0.5$ ms. N and T can alternatively be defined in another way.

Figure 4A:
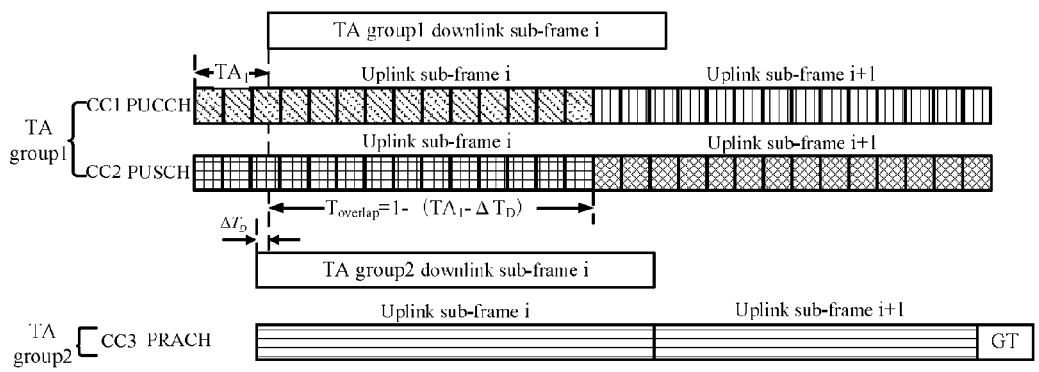
FIG. 4A is a first schematic diagram of overlapping transmission of a PRACH with a PUCCH/PUSCH in the first embodiment of the invention.
Figure 4B:
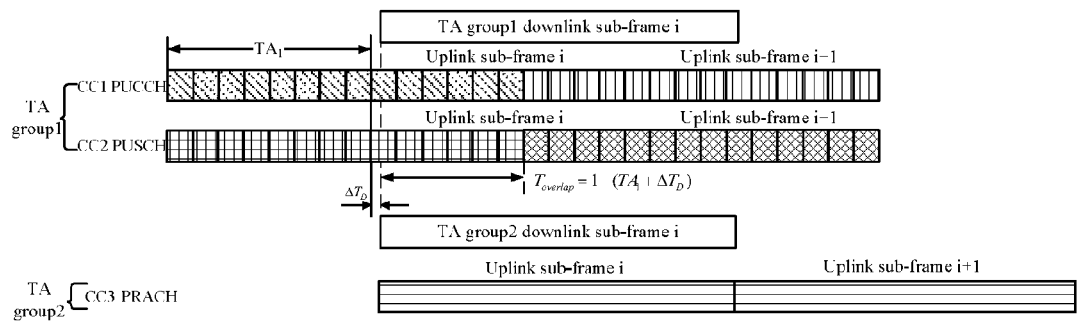
FIG. 4B is a second schematic diagram of overlapping transmission of a PRACH with a PUCCH/PUSCH in the first embodiment of the invention.

In the first embodiment of the invention, the transmission time length of the uplink signal, overlapping with the preamble sequence carried in the PRACH, in the current uplink sub-frame can be determined in the following three scenarios:

In a first scenario, the current uplink sub-frame is the first transmission sub-frame of the PRACH, that is, the uplink signals in the current uplink sub-frame overlap in transmission only with the PRACH in the current uplink sub-frame, and at this time:

When the preamble sequence of the PRACH in the format 1, 2 or 3, the length of the overlapping transmission time is $T_{overlap,c} = 1 - (TA_c \pm \Delta T_{D,c})$, where if the reception timing of the downlink sub-frame corresponding to the uplink signal lags behind the reception timing of the downlink sub-frame corresponding to the PRACH, as illustrated in FIG. 4A, then "−" holds true for "±", that is, $T_{overlap,c} = 1 - TA_c + \Delta T_{D,c}$; or if the reception timing of the downlink sub-frame corresponding to the uplink signal is in advance of the reception timing of the downlink sub-frame corresponding to the PRACH, as illustrated in FIG. 4B, then "+" holds true for "±", that is, $T_{overlap,c} = 1 - TA_c - \Delta T_{D,c}$, where $T_{overlap,c}$ is in unit of ms.

Figure 4C:
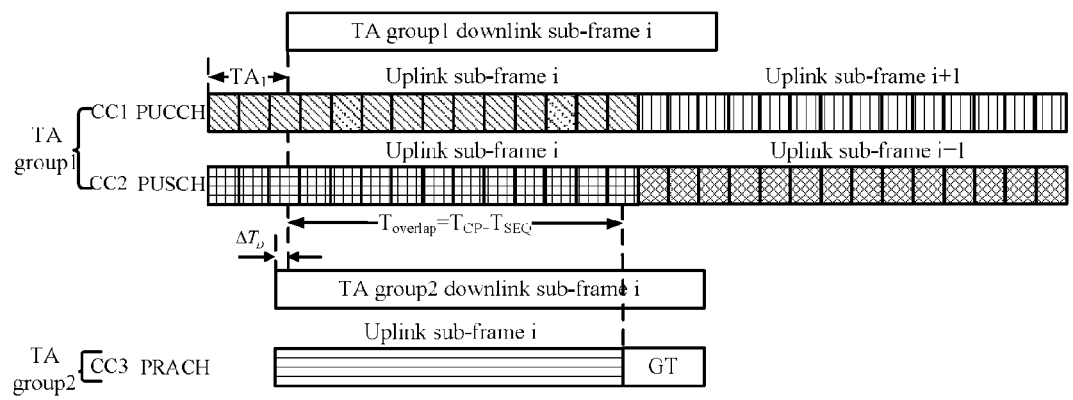
FIG. 4C is a third schematic diagram of overlapping transmission of a PRACH with a PUCCH/PUSCH in the first embodiment of the invention.

When the preamble sequence of the PRACH in the format 0, if $T_{CP} + T_{SEQ} < 1 - (TA_c \pm \Delta T_{D,c})$, as illustrated in FIG. 4C, then the length of the overlapping transmission time is $T_{overlap,c} = T_{CP} + T_{SEQ}$; otherwise, $T_{overlap,c} = 1 - (TA_c \pm \Delta T_{D,c})$, and in this equation, if the reception timing of the downlink sub-frame corresponding to the uplink signal lags behind the reception timing of the downlink sub-frame corresponding to the PRACH, then "−" holds true for "±"; or if the reception timing of the downlink sub-frame corresponding to the uplink signal is in advance of the reception timing of the downlink sub-frame corresponding to the PRACH, then "+" holds true for "±".

Figure 5:
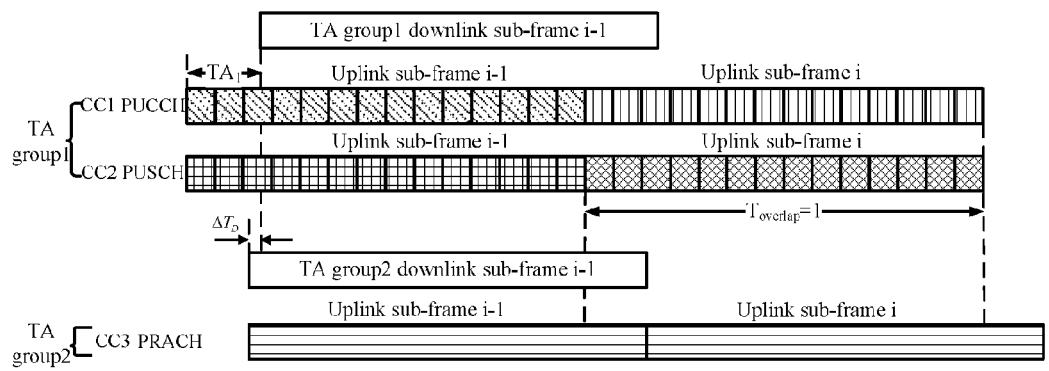
FIG. 5 is a fourth schematic diagram of overlapping transmission of a PRACH with a PUCCH/PUSCH in the first embodiment of the invention.

In a second scenario, the current uplink sub-frame is neither the first transmission sub-frame of the PRACH nor the last transmission sub-frame of the PRACH (the preamble sequence is in the format 3, and the current uplink sub-frame includes no GT), that is, the uplink signals in the current uplink sub-frame overlap in transmission with the PRACHs in the current uplink sub-frame and the previous adjacent uplink sub-frame, and at this time the length of the overlapping transmission time is $T_{overlap,c} = 1$ milliseconds, as illustrated in FIG. 5, and preferably at this time the UE scales down all the SC-FDMA symbols of the uplink signals concurrently.

Figure 6A:
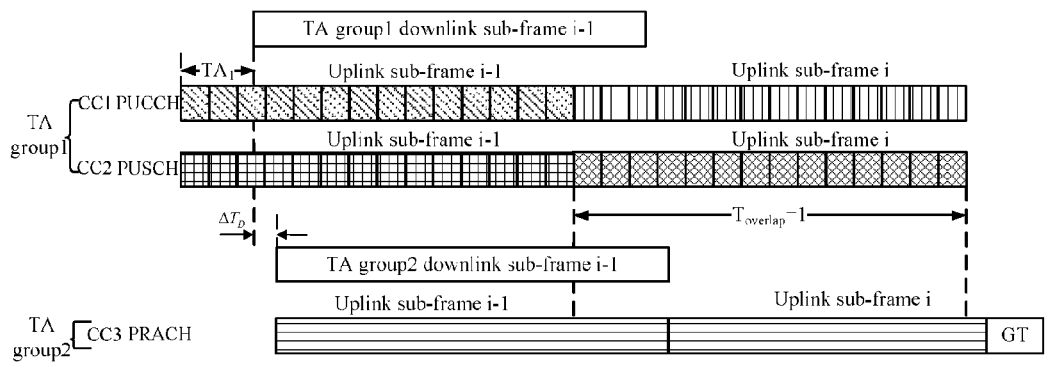
FIG. 6A is a fifth schematic diagram of overlapping transmission of a PRACH with a PUCCH/PUSCH in the first embodiment of the invention.
Figure 6B:
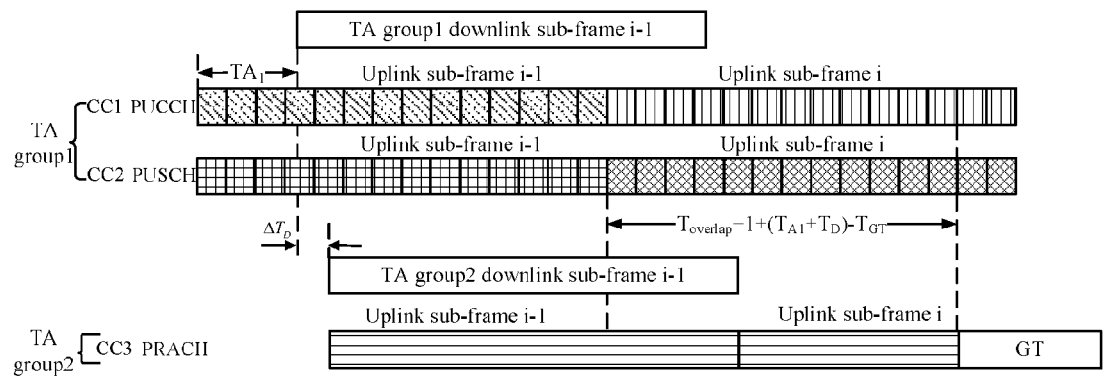
FIG. 6B is a sixth schematic diagram of overlapping transmission of a PRACH with a PUCCH/PUSCH in the first embodiment of the invention.
Figure 6C:
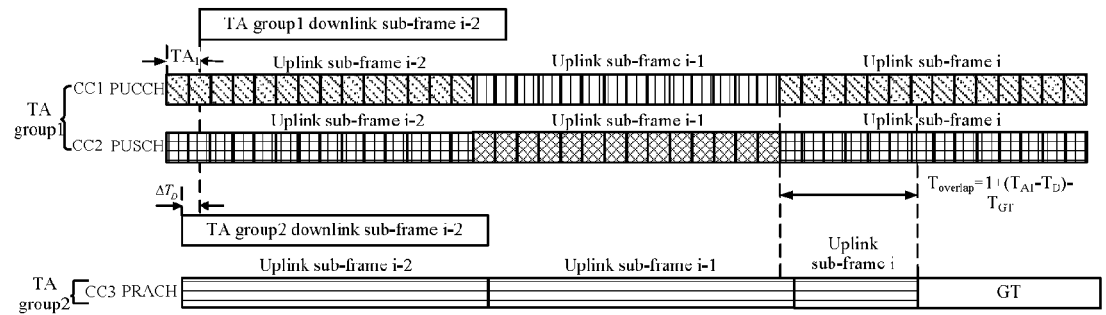
FIG. 6C is a seventh schematic diagram of overlapping transmission of a PRACH with a PUCCH/PUSCH in the first embodiment of the invention.

In a third scenario, the current uplink sub-frame is the last transmission sub-frame of the PRACH, that is, the uplink signals in the current uplink sub-frame overlap in transmission with the PRACHs in the current uplink sub-frame and the previous adjacent uplink sub-frame, and if $TA_c \pm \Delta T_{D,c} \geq T_{GT}$, then the length of the overlapping transmission time is $T_{overlap,c} = 1$ millisecond, as illustrated in FIG. 6A, and preferably at this time the UE scales down all the SC-FDMA symbols of the uplink signals concurrently; otherwise, the length of the overlapping transmission time is $T_{overlap,c} = 1 + (TA_c \pm \Delta T_{D,c}) - T_{GT}$, as illustrated in FIG. 6B and FIG. 6C. In this equation, if the reception timing of the downlink sub-frame corresponding to the uplink signal lags behind the reception timing of the downlink sub-frame corresponding to the PRACH, then "−" holds true for "±"; or if the reception timing of the downlink sub-frame corresponding to the uplink signal is in advance of the reception timing of the downlink sub-frame corresponding to the PRACH, then "+" holds true for "±".

In FIG. 4A, FIG. 4B, FIG. 4C, FIG. 5, FIG. 6A, FIG. 6B and FIG. 6C, CC1 and CC2 represent carriers in a TA group1, CC3 represents a carrier in a TA group2, an uplink signal transmitted on the CC1 is a PUCCH, an uplink signal transmitted on the CC2 is a PUSCH, an uplink signal transmitted on the CC3 is a PRACH, and $TA_1$ represents a TA of the TA group1, that is, the $TA_1$ represents a TA of the CC1 on which the PUCCH is transmitted and the CC2 on which the PUSCH is transmitted.

The UE can further determine the number $N_{overlap,c}$ of the overlapping SC-FDMA symbols after determining the length of the overlapping transmission time $T_{overlap,c}$ where $N_{overlap,c}$ can be determined according to the length of the overlapping transmission time $T_{overlap,c}$ and the real time length of each SC-FDMA symbol on the carrier.

In a fifth mode, the UE determines which mode to be used when performing uplink power control according to the configured preamble format. For example, the second or third mode described above can be used for performing uplink power control for the preamble format 0 or 2; and the first or fourth mode described above can be used for performing uplink power control for the preamble format 1 or 3.

In the first embodiment of the invention, in multiple methods of scaling down power in the event that a PRACH is transmitted in the current uplink sub-frame and in the event that no PRACH is transmitted in the current uplink sub-frame, the particular process of scaling down the target transmit power of all or a part of SC-FDMA symbols of the uplink signal required to be power scaled among the uplink signals in the current uplink sub-frame can be as follows without any limitation:

The UE firstly determines an uplink signal with non-zero transmit power and with the lowest priority among the uplink signals in the current uplink sub-frame as the uplink signal required to be power scaled according to the priorities of the uplink signals, where the uplink signal priorities of the respective uplink signals from high to low are as follows: PUCCH>PUSCH with UCI>PUSCH without UCI>SRS. The UE scales down the target transmit power of all or a part of SC-FDMA symbols of the uplink signal required to be power scaled by the same scaling factor, that is, preferentially scales down the target transmit power of the uplink signal at the lowest priority by the same scaling factor in order to make the sum of the scaled transmit power of all the uplink signals not exceed the allowed maximum transmit power of the UE, and if the sum of the transmit power of all the uplink signals would still exceed the allowed maximum transmit power of the UE when the target transmit power of the uplink signal with the lowest priority is scaled down to zero, then the UE further scales down the target transmit power of an uplink signal with the next lowest priority and so on until the sum of the scaled transmit power of all the uplink signals does not exceed the allowed maximum transmit power of the UE.

If the uplink signals in the current uplink sub-frame includes an SRS, then the UE determines an uplink signal with non-zero transmit power and with the lowest priority other than the SRS among the uplink signals in the current uplink sub-frame as the uplink signal required to be power scaled according to the priorities of the uplink signals and then scales down the target transmit power of all or a part of SC-FDMA symbols of the uplink signal required to be power scaled by the same scaling factor until the sum of the target transmit power of the other uplink signals than the SRS in the current uplink sub-frame does not exceed the maximum transmit power currently available, and scales down the target transmit power of the SRS by the same scaling factor until the sum of the transmit power of the SRS and uplink signals overlapping with the SRS among the uplink signals in the current uplink sub-frame does not exceed the maximum transmit power currently available, where the maximum transmit power currently available can be the maximum transmit power of the UE (for example, when no PRACH is transmitted in the current uplink sub-frame, or when no PRACH is transmitted in the current uplink sub-frame but a PRACH is transmitted in the previous adjacent uplink sub-frame of the current uplink sub-frame and the PRACH does not overlap with the uplink signals) or can be the maximum transmit power of the UE minus the target transmit power of the PRACH (for example, when a PRACH is transmitted in the current uplink sub-frame, or when no PRACH is transmitted in the current uplink sub-frame but a PRACH is transmitted in the previous adjacent uplink sub-frame of the current uplink sub-frame and the PRACH overlaps with the uplink signals); and other power control methods are possible for concurrent transmission of an SRS and an uplink channel (PUCCH/PUSCH/PRACH) in different TA groups in the case of multi-TA transmission.

It shall be noted that in the first embodiment of the invention, when the UE scales down the transmit power of only a part of the SC-FDMA symbols of the uplink signal required to be power scaled among the uplink signals in the current uplink sub-frame, power control can be performed separately on the remaining SC-FDMA symbols of the uplink signal in the current uplink sub-frame in accordance with the power control method in the Rel-10 so that the sum of the transmit power of the remaining SC-FDMA symbols of the uplink signal in the current uplink sub-frame does not exceed the maximum transmit power of the UE.

In the first embodiment of the invention, when the first mode is used for performing uplink power control, for FIG. 4A, FIG. 4B, FIG. 4C, FIG. 5, FIG. 6A, FIG. 6B and FIG. 6C, the UE can scale down the power of all the SC-FDMA symbols of the uplink signal in the uplink sub-frame i concurrently regardless of the number of SC-FDMA symbols, overlapping with the PRACH, in the uplink signal in the uplink sub-frame i.

When the second mode is used for performing uplink power control, for FIG. 4A, FIG. 4B, FIG. 4C, FIG. 5, FIG. 6A, FIG. 6B and FIG. 6C, the UE can scale down the transmit power of only the overlapping SC-FDMA symbols regardless of the number of SC-FDMA symbols, overlapping with the PRACH, in the uplink signal in the uplink sub-frame i; or the UE can determine according to the slots including the overlapping SC-FDMA symbols, and for FIG. 4A, FIG. 4C, FIG. 5, FIG. 6A and FIG. 6B, the overlapping SC-FDMA symbols are included in two slots, and at this time the UE scales down the power of all the SC-FDMA symbols of the uplink signal concurrently; for FIG. 4B, the overlapping SC-FDMA symbols are included in only the second slot, and at this time the UE scales down the power of the SC-FDMA symbols in only the second slot of the uplink signal; and for FIG. 6C, the overlapping SC-FDMA symbols are included in only the first slot, and at this time the UE scales down the power of the SC-FDMA symbols in only the first slot of the uplink signal.

When the third mode is used for performing uplink power control, for FIG. 4A, FIG. 4B, FIG. 4C, FIG. 5, FIG. 6A, FIG. 6B and FIG. 6C, if the sum of the target transmit power of the PUCCH and the PUSCH in the current uplink sub-frame does not exceed the maximum transmit power of the UE, then the second mode can be used for performing uplink power control; otherwise the power of all the SC-FDMA symbols of the uplink signal is scaled down concurrently.

When the mode 4-1 is used for performing uplink power control, it is assumed that the number of SC-FDMA symbols is defined as 7 and the time length threshold T is defined as 0.5 ms. For FIG. 4A, FIG. 4C, FIG. 5, FIG. 6A and FIG. 6B, the number of the overlapping SC-FDMA symbols exceeds N, or the length of the overlapping transmission time exceeds T, and at this time the UE scales down the power of all the SC-FDMA symbols of the uplink signal concurrently; for FIG. 4B and FIG. 6C, the number of the overlapping SC-FDMA symbols does not exceed N, or the length of the overlapping transmission time does not exceed T, and at this time the UE scales down the power of only the overlapping SC-FDMA symbols; or for FIG. 4B, the overlapping SC-FDMA symbols are included in only the second slot, and at this time the UE scales down the power of the SC-FDMA symbols in only the second slot; and for FIG. 6C, the overlapping SC-FDMA symbols are included in only the first slot, and at this time the UE scales down the power of the SC-FDMA symbols in only the first slot.

When the mode 4-2 is used for performing uplink power control, for FIG. 4A, FIG. 4B, FIG. 4C, FIG. 5, FIG. 6A, FIG. 6B and FIG. 6C, if the sum of the target transmit power of the PUCCH and the PUSCH in the uplink sub-frame i does not exceed the maximum transmit power of the UE, then the mode 4-1 can be used for performing uplink power control; otherwise, the power of all the SC-FDMA symbols of the uplink signal is scaled down concurrently.

In the first embodiment of the invention, the respective synchronized uplink component carriers in the current uplink sub-frame and the uplink SCC on which the PRACH is transmitted belong to different TA groups. If the uplink signals transmitted on the respective synchronized uplink component carriers in the current uplink sub-frame include at least two uplink signals, then TA values of these uplink signals can be the same, that is, the uplink component carriers on which these uplink signals are transmitted can belong to the same TA group; or TA values of these uplink signals can be different, that is, the uplink component carriers on which these uplink signals are transmitted can belong to different TA groups.

The uplink power control method according to the first embodiment of the invention can be not only applicable to the LTE system but also to an FDD (Frequency Division Duplexing) system and a TDD system.

As can be apparent from the process described above, in the technical solution according to the embodiment of the invention, the UE determines target transmit power of uplink signals transmitted on respective synchronized uplink component carriers in a current uplink sub-frame, and judges whether a PRACH is transmitted on an uplink secondary component carrier in the current uplink sub-frame, and if so, then it indicates such a situation that the PRACH overlaps in transmission with the uplink signals occurs, and at this time the UE can determine target transmit power of the PRACH and further judge whether the sum of the target transmit power of the uplink signals and the target transmit power of the PRACH would exceed the maximum transmit power of the UE, and if so, then the UE maintains the target transmit power of the PRACH unchanged and scales down target transmit power of all or a part of SC-FDMA symbols of an uplink signal required to be power scaled among the uplink signals in the current uplink sub-frame until the sum of the transmit power of the uplink signals in the current uplink sub-frame does not exceed the maximum transmit power of the UE minus the target transmit power of the PRACH. As can be apparent, the technical solution according to the embodiments of the invention proposes a particular implementation solution of performing uplink power control in the case that the PRACH overlaps in transmission with another uplink signal so as to ensure the normal operation of the UE.

Second Embodiment

Figure 7:
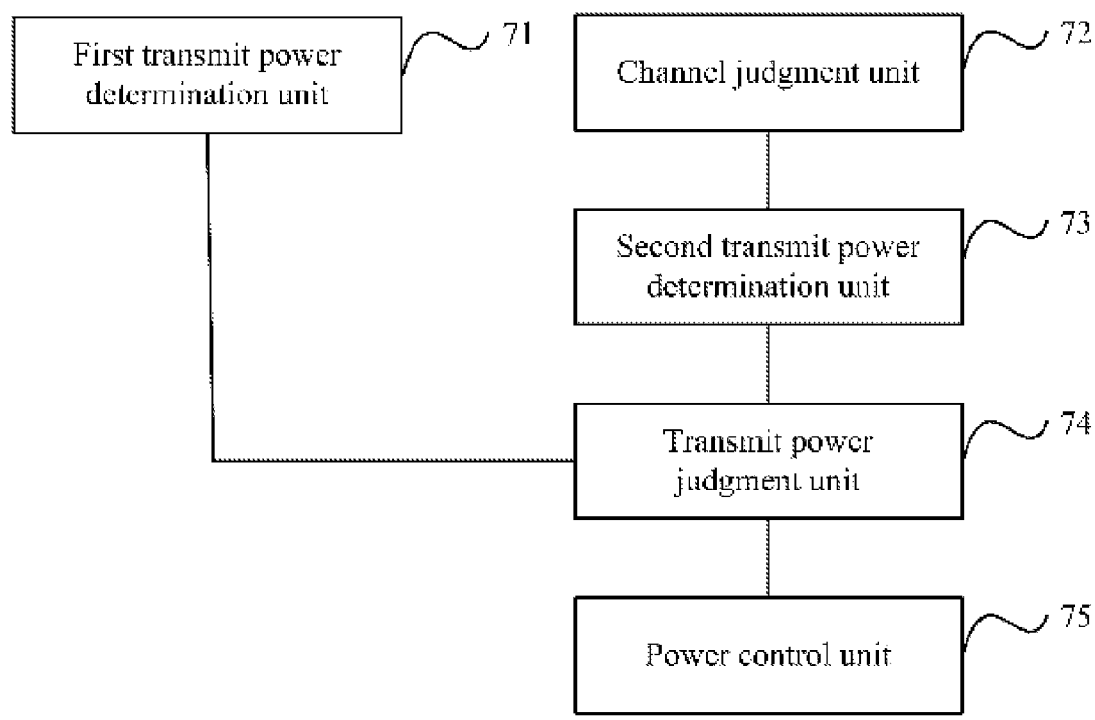
FIG. 7 is a schematic structural diagram of a UE according to a second embodiment of the invention.

Based upon the uplink power control method according to the first embodiment of the invention, the second embodiment of the invention proposes a UE, as illustrated in FIG. 7, which includes:

A first transmit power determination unit 71 configured to determine target transmit power of uplink signals transmitted on respective synchronized uplink component carriers in a current uplink sub-frame;

A channel judgment unit 72 configured to judge whether a PRACH is transmitted on an uplink secondary component carrier in the current uplink sub-frame;

A second transmit power determination unit 73 configured to determine target transmit power of the PRACH when the channel judgment unit 72 judges that the PRACH is transmitted on the uplink secondary component carrier in the current uplink sub-frame;

A transmit power judgment unit 74 configured to judge whether a sum of the target transmit power of the uplink signals and the target transmit power of the PRACH would exceed the maximum transmit power of the UE; and A power control unit 75 configured to maintain the target transmit power of the PRACH unchanged, and to scale down target transmit power of all or a part of SC-FDMA symbols of the uplink signal required to be power scaled among the uplink signals in the current uplink sub-frame until a sum of transmit power of the uplink signals in the current uplink sub-frame does not exceed the maximum transmit power of the UE minus the target transmit power of the PRACH when the transmit power judgment unit 74 judges that the sum of the target transmit power of the uplink signals and the target transmit power of the PRACH would exceed the maximum transmit power of the UE.

In a preferred implementation of the second embodiment of the invention, the UE further includes a transmission unit configured to transmit with the target transmit power of the uplink signals and the target transmit power of the PRACH when the transmit power judgment unit 74 judges that the sum of the target transmit power of the uplink signals and the target transmit power of the PRACH does not exceed the maximum transmit power of the UE.

In a preferred implementation of the second embodiment of the invention, when the channel judgment unit 72 judges that no PRACH is transmitted on any uplink secondary component carrier in the current uplink sub-frame, the transmit power judgment unit 74 is further configured to judge whether a sum of the target transmit power of the uplink signals would exceed the maximum transmit power of the UE;

When the transmit power judgment unit 74 judges that the sum of the target transmit power of the uplink signals would exceed the maximum transmit power of the UE, the power control unit 75 is further configured to scale down target transmit power of all the SC-FDMA symbols of the uplink signal required to be power scaled among the uplink signals in the current uplink sub-frame until the sum of the transmit power of the uplink signals in the current uplink sub-frame does not exceed the maximum transmit power of the UE;

When the transmit power judgment unit 74 judges that the sum of the target transmit power of the uplink signals does not exceed the maximum transmit power of the UE, the transmission unit is further configured to transmit with the target transmit power of the uplink signals.

In a preferred implementation of the second embodiment of the invention, the UE further includes:

An overlapping judgment unit configured, when the channel judgment unit 72 judges that no PRACH is transmitted on any uplink secondary component carrier in the current uplink sub-frame and a PRACH is transmitted on an uplink secondary component carrier in a previous adjacent uplink sub-frame of the current uplink sub-frame, to judge whether the uplink signals in the current uplink sub-frame overlap with a preamble sequence carried in the PRACH in the previous adjacent uplink sub-frame.

When the overlapping judgment unit judges that the uplink signals in the current uplink sub-frame do not overlap with the preamble sequence carried in the PRACH in the previous adjacent uplink sub-frame, the transmit power judgment unit 74 is further configured to judge whether a sum of the target transmit power of the uplink signals would exceed the maximum transmit power of the UE.

When the transmit power judgment unit 74 judges that the sum of the target transmit power of the uplink signals would exceed the maximum transmit power of the UE, the power control unit 75 is further configured to scale down target transmit power of all the SC-FDMA symbols of the uplink signal required to be power scaled among the uplink signals in the current uplink sub-frame until the sum of the transmit power of the uplink signals in the current uplink sub-frame does not exceed the maximum transmit power of the UE.

When the transmit power judgment unit 74 judges that the sum of the target transmit power of the uplink signals does not exceed the maximum transmit power of the UE, the transmission unit is further configured to transmit with the target transmit power of the uplink signals.

When the overlapping judgment unit judges that the uplink signals in the current uplink sub-frame overlap with the preamble sequence carried in the PRACH in the previous adjacent uplink sub-frame, the second transmit power determination unit 73 is further configured to determine target transmit power of the PRACH in the previous adjacent uplink sub-frame; and The transmit power judgment unit 74 is further configured to judge whether a sum of the target transmit power of the uplink signals in the current uplink sub-frame and the target transmit power of the PRACH in the previous adjacent uplink sub-frame would exceed the maximum transmit power of the UE.

When the transmit power judgment unit 74 judges that the sum of the target transmit power of the uplink signals in the current uplink sub-frame and the target transmit power of the PRACH in the previous adjacent uplink sub-frame would exceed the maximum transmit power of the UE, the power control unit 75 is further configured to maintain the target transmit power of the PRACH in the previous adjacent uplink sub-frame unchanged and to scale down target transmit power of all or a part of the SC-FDMA symbols of the uplink signal required to be power scaled among the uplink signals in the current uplink sub-frame until the sum of the transmit power of the uplink signals in the current uplink sub-frame does not exceed the maximum transmit power of the UE minus the target transmit power of the PRACH.

When the transmit power judgment unit 74 judges that the sum of the target transmit power of the uplink signals in the current uplink sub-frame and the target transmit power of the PRACH in the previous adjacent uplink sub-frame does not exceed the maximum transmit power of the UE, the transmission unit is configured to transmit with the target transmit power of the uplink signals.

In a more preferred implementation of the second embodiment of the invention, the overlapping judgment unit is specifically configured:

If $TA_c \pm \Delta T_{D,c} \leq T_{GT}$ or $TA_c \pm \Delta T_{D,c} > T_{GT}$ and $\Delta T_{D,c} \leq T_{TP}$, to judge that the uplink signals in the current uplink sub-frame do not overlap with the preamble sequence carried in the PRACH in the previous adjacent uplink sub-frame; otherwise, to judge that the uplink signals in the current uplink sub-frame overlap with the preamble sequence carried in the PRACH in the previous adjacent uplink sub-frame.

Here $TA_c$ represents a time advance of an uplink transmission timing of a carrier on which the uplink signal is transmitted, and c represents the index of the carrier on which the uplink signal is transmitted; $\Delta T_{D,c}$ represents the difference in downlink reception timing between a carrier on which the PRACH is transmitted and the carrier on which the uplink signal is transmitted; $T_{GT}=K \cdot 1-(T_{CP}+T_{SEQ})$, where K represents the number of uplink sub-frames occupied by the preamble format corresponding to the preamble sequence, $T_{CP}$ represents the length of a CP in the preamble format, and $T_{SEQ}$ represents the length of a sequence in the preamble format. $T_{TP}$ represents the transient period defined at the initial transmission location of the uplink signal in the current uplink sub-frame.

In a preferred implementation of the second embodiment of the invention, when the power control unit 75 is further configured to maintain the target transmit power of the PRACH in the previous adjacent uplink sub-frame unchanged and to scale down the target transmit power of a part of the SC-FDMA symbols of the uplink signal required to be power scaled among the uplink signals in the current uplink sub-frame, the power control unit 75 is specifically configured:

For the uplink signal required to be power scaled among the uplink signals, to scale down target transmit power of SC-FDMA symbols, overlapping with the preamble sequence carried in the PRACH, in the uplink signal in the current uplink sub-frame, or to scale down target transmit power of all SC-FDMA symbols in a slot including SC- FDMA symbols, overlapping with the preamble sequence carried in the PRACH, in the uplink signal in the current uplink sub-frame; or If the uplink signals include at least two uplink signals and the sum of the target transmit power of the respective uplink signals does not exceed the maximum transmit power of the UE, then for the uplink signal required to be power scaled among the uplink signals, to scale down target transmit power of SC-FDMA symbols, overlapping with the preamble sequence carried in the PRACH, in the uplink signal in the current uplink sub-frame, or to scale down target transmit power of all SC-FDMA symbols in a slot including SC-FDMA symbols, overlapping with the preamble sequence carried in the PRACH, in the uplink signal in the current uplink sub-frame; otherwise, for the uplink signal required to be power scaled among the uplink signals, to scale down target transmit power of all the SC-FDMA symbols of the uplink signal in the current uplink sub-frame.

In a preferred implementation of the second embodiment of the invention, the power control unit 75 is specifically configured:

For the uplink signal required to be power scaled among the uplink signals, to scale down target transmit power of SC-FDMA symbols, overlapping with a preamble sequence carried in the PRACH, in the uplink in the current uplink sub-frame, or to scale down target transmit power of all SC-FDMA symbols in a slot including SC-FDMA symbols, overlapping with the preamble sequence carried in the PRACH, in the uplink signal in the current uplink sub-frame, wherein the overlapping SC-FDMA symbols include SC-FDMA symbols, overlapping with the preamble sequence carried in the PRACH in the current uplink sub-frame or a previous adjacent uplink sub-frame, in the uplink signal.

In a preferred implementation of the second embodiment of the invention, the power control unit 75 is specifically configured:

If the uplink signals include at least two uplink signals and the sum of the target transmit power of the respective uplink signals does not exceed the maximum transmit power of the UE, then for the uplink signal required to be power scaled among the uplink signals, to scale down target transmit power of SC-FDMA symbols, overlapping with a preamble sequence carried in the PRACH, in the uplink signal in the current uplink sub-frame, or to scale down target transmit power of all SC-FDMA symbols in a slot including SC-FDMA symbols, overlapping with the preamble sequence carried in the PRACH, in the uplink signal in the current uplink sub-frame, wherein the overlapping SC-FDMA symbols include SC-FDMA symbols, overlapping with the preamble sequence carried in the PRACH in the current uplink sub-frame or a previous adjacent uplink sub-frame, in the uplink signal; otherwise, For the uplink signal required to be power scaled among the uplink signals, to scale down target transmit power of all the SC-FDMA symbols of the uplink signal in the current uplink sub-frame.

In a preferred implementation of the second embodiment of the invention, the power control unit 75 is specifically configured:

For the uplink signal required to be power scaled among the uplink signals, to scale down the target transmit power of all or a part of the SC-FDMA symbols of the uplink signal according to the number of SC-FDMA symbols, overlapping with a preamble sequence carried in the PRACH, in the uplink signal in the current uplink sub-frame or a transmission time length of the uplink signal, overlapping with the preamble sequence carried in the PRACH, in the current uplink sub-frame, wherein the overlapping SC-FDMA symbols or the overlapping transmission time include or includes SC-FDMA symbols or transmission time, overlapping with the preamble sequence carried in the PRACH in the current uplink sub-frame or a previous adjacent uplink sub-frame, in the uplink signal.

In a more preferred implementation of the second embodiment of the invention, the power control unit 75 is specifically configured:

To judge whether the number of the overlapping SC-FDMA symbols is not greater than a preset number of SC-FDMA symbols or to judge whether the overlapping transmission time length is not greater than a preset time length threshold;

If so, to scale down target transmit power of the overlapping SC-FDMA symbols in the uplink signal in the current uplink sub-frame or scaling down target transmit power of all SC-FDMA symbols in a slot including the overlapping SC-FDMA symbols in the uplink signal in the current uplink sub-frame; otherwise, To scale down the target transmit power of all the SC-FDMA symbols of the uplink signal in the current uplink sub-frame.

In a more preferred implementation of the second embodiment of the invention, the power control unit 75 is specifically configured:

If the uplink signals in the current uplink sub-frame include at least two uplink signals and the sum of the target transmit power of the respective uplink signals would exceed the maximum transmit power of the UE, to scale down the target transmit power of all the SC-FDMA symbols of the uplink signal required to be power scaled in the current uplink sub-frame; otherwise, For the uplink signal required to be power scaled among the uplink signals, to judge whether the number of the overlapping SC-FDMA symbols is not greater than a preset number of SC-FDMA symbols or to judge whether the overlapping transmission time length is not greater than a preset time length threshold; and If so, to scale down target transmit power of the overlapping SC-FDMA symbols in the uplink signal in the current uplink sub-frame or to scale down target transmit power of all SC-FDMA symbols in a slot including the overlapping SC-FDMA symbols in the uplink signal in the current uplink sub-frame; otherwise, to scale down the target transmit power of all the SC-FDMA symbols of the uplink signal in the current uplink sub-frame.

In a preferred implementation of the second embodiment of the invention, the power control unit 75 is specifically configured:

To determine an uplink signal with non-zero transmit power and with a lowest priority among the uplink signals in the current uplink sub-frame as the uplink signal required to be power scaled according to priorities of the uplink signals and to scale down the target transmit power of all or a part of the SC-FDMA symbols of the uplink signal required to be power scaled by a same scaling factor; or If the uplink signals in the current uplink sub-frame includes an SRS, to determine an uplink signal with non-zero transmit power and with a lowest priority other than the SRS among the uplink signals in the current uplink sub-frame as the uplink signal required to be power scaled according to priorities of the uplink signals, to scale down the target transmit power of all or a part of the SC-FDMA symbols of the uplink signal required to be power scaled by a same scaling factor until a sum of target transmit power of other uplink signals than the SRS in the current uplink sub-frame does not exceed maximum transmit power currently available, and to scale down target transmit power of the SRS by a same scaling factor until a sum of transmit power of the SRS and transmit power of uplink signals overlapping with the SRS among the uplink signals in the current uplink sub-frame does not exceed the maximum transmit power currently available, wherein the maximum transmit power currently available is the maximum transmit power of the UE or the maximum transmit power of the UE minus the target transmit power of the PRACH.

Here the priorities of the uplink signals from high to low are as follows: a PUCCH higher than a PUSCH with UCI higher than a PUSCH without UCI higher than an SRS.

In a preferred implementation of the second embodiment of the invention, the uplink signals include a PUCCH and/or a PUSCH and/or an SRS.

In a preferred implementation of the second embodiment of the invention, if the PRACH is transmitted across multiple uplink sub-frames, then transmit power of the PRACH in the respective uplink sub-frame is constant.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

What is claimed is:

1. An uplink power control method, comprising:
a User Equipment, UE, determining target transmit power of uplink signals transmitted on respective synchronized uplink component carriers in a current uplink sub-frame;
judging whether a Physical Random Access Channel, PRACH, is transmitted on an uplink secondary component carrier in the current uplink sub-frame;
if so, then determining target transmit power of the PRACH and further judging whether a sum of the target transmit power of the uplink signals and the target transmit power of the PRACH would exceed maximum transmit power of the UE;
if so, then maintaining the target transmit power of the PRACH unchanged, and scaling down target transmit power of all or a part of Single Carrier-Frequency Division Multiple Access, SC-FDMA, symbols of an uplink signal required to be power scaled among the uplink signals in the current uplink sub-frame until a sum of transmit power of the uplink signals in the current uplink sub-frame does not exceed the maximum transmit power of the UE minus the target transmit power of the PRACH; wherein,
if it is judged that no PRACH is transmitted on any uplink secondary component carrier in the current uplink sub-frame, then:
when a PRACH is transmitted on an uplink secondary component carrier in a previous adjacent uplink sub-frame of the current uplink sub-frame, judging whether the uplink signals in the current uplink sub-frame overlap with a preamble sequence carried in the PRACH in the previous adjacent uplink sub-frame, and
if not overlap, then further judging whether a sum of the target transmit power of the uplink signals would exceed the maximum transmit power of the UE, if so, then scaling down target transmit power of all the SC-FDMA symbols of the uplink signal required to be power scaled among the uplink signals in the current uplink sub-frame until the sum of the transmit power of the uplink signals in the current uplink sub-frame does not exceed the maximum transmit power of the UE; otherwise, transmitting with the target transmit power of the uplink signals, or
if overlap, then determining target transmit power of the PRACH in the previous adjacent uplink sub-frame and further judging whether a sum of the target transmit power of the uplink signals in the current uplink sub-frame and the target transmit power of the PRACH in the previous adjacent uplink sub-frame would exceed the maximum transmit power of the UE, if so, then maintaining the target transmit power of the PRACH in the previous adjacent uplink sub-frame unchanged and scaling down target transmit power of all or a part of the SC-FDMA symbols of the uplink signal required to be power scaled among the uplink signals in the current uplink sub-frame until the sum of the transmit power of the uplink signals in the current uplink sub-frame does not exceed the maximum transmit power of the UE minus the target transmit power of the PRACH; otherwise, transmitting with the target transmit power of the uplink signals;

wherein scaling down the target transmit power of all or a part of the SC-FDMA symbols of the uplink signal required to be power scaled among the uplink signals in the current uplink sub-frame specifically comprises:

for the uplink signal required to be power scaled among the uplink signals, scaling down target transmit power of SC-FDMA symbols, overlapping with a preamble sequence carried in the PRACH, in the uplink signal in the current uplink sub-frame, or scaling down target transmit power of all SC-FDMA symbols in a slot including SC-FDMA symbols, overlapping with the preamble sequence carried in the PRACH, in the uplink signal in the current uplink sub-frame, wherein the overlapping SC-FDMA symbols include SC-FDMA symbols, overlapping with the preamble sequence carried in the PRACH in the current uplink sub-frame or a previous adjacent uplink sub-frame, in the uplink signal; or if the uplink signals include at least two uplink signals and the sum of the target transmit power of the respective uplink signals does not exceed the maximum transmit power of the UE, then for the uplink signal required to be power scaled among the uplink signals, scaling down target transmit power of SC-FDMA symbols, overlapping with a preamble sequence carried in the PRACH, in the uplink signal in the current uplink sub-frame, or scaling down target transmit power of all SC-FDMA symbols in a slot including SC-FDMA symbols, overlapping with the preamble sequence carried in the PRACH, in the uplink signal in the current uplink sub-frame, wherein the overlapping SC-FDMA symbols include SC-FDMA symbols, overlapping with the preamble sequence carried in the PRACH in the current uplink sub-frame or a previous adjacent uplink sub-frame, in the uplink signal; otherwise, for the uplink signal required to be power scaled among the uplink signals, scaling down target transmit power of all the SC-FDMA symbols of the uplink signal in the current uplink sub-frame; or for the uplink signal required to be power scaled among the uplink signals, scaling down the target transmit power of all or a part of the SC-FDMA symbols of the uplink signal according to the number of SC-FDMA symbols, overlapping with a preamble sequence carried in the PRACH, in the uplink signal in the current uplink sub-frame or a transmission time length of the uplink signal, overlapping with the preamble sequence carried in the PRACH, in the current uplink sub-frame, wherein the overlapping SC-FDMA symbols or the overlapping transmission time include or includes SC-FDMA symbols or transmission time, overlapping with the preamble sequence carried in the PRACH in the current uplink sub-frame or a previous adjacent uplink sub-frame, in the uplink signal.

2. The method according to claim 1, further comprising: transmitting with the target transmit power of the uplink signals and the target transmit power of the PRACH if it is judged that the sum of the target transmit power of the uplink signals and the target transmit power of the PRACH does not exceed the maximum transmit power of the UE.

3. The method according to claim 1, wherein scaling down the target transmit power of a part of the SC-FDMA symbols of the uplink signal required to be power scaled among the uplink signals in the current uplink sub-frame specifically comprises:

for the uplink signal required to be power scaled among the uplink signals, scaling down target transmit power of SC-FDMA symbols, overlapping with the preamble sequence carried in the PRACH, in the uplink signal in the current uplink sub-frame, or scaling down target transmit power of all SC-FDMA symbols in a slot including SC-FDMA symbols, overlapping with the preamble sequence carried in the PRACH, in the uplink signal in the current uplink sub-frame; or if the uplink signals include at least two uplink signals and the sum of the target transmit power of the respective uplink signals does not exceed the maximum transmit power of the UE, then for the uplink signal required to be power scaled among the uplink signals, scaling down target transmit power of SC-FDMA symbols, overlapping with the preamble sequence carried in the PRACH, in the uplink signal in the current uplink sub-frame, or scaling down target transmit power of all SC-FDMA symbols in a slot including SC-FDMA symbols, overlapping with the preamble sequence carried in the PRACH, in the uplink signal in the current uplink sub-frame; otherwise, for the uplink signal required to be power scaled among the uplink signals, scaling down target transmit power of all the SC-FDMA symbols of the uplink signal in the current uplink sub-frame.

4. The method according to claim 1, wherein for the uplink signal required to be power scaled among the uplink signals, scaling down the target transmit power of all or a part of the SC-FDMA symbols of the uplink signal according to the number of SC-FDMA symbols, overlapping with the preamble sequence carried in the PRACH, in the uplink signal in the current uplink sub-frame or the transmission time length of the uplink signal, overlapping with the preamble sequence carried in the PRACH, in the current uplink sub-frame specifically comprises:

judging whether the number of the overlapping SC-FDMA symbols is not greater than a preset number of SC-FDMA symbols or judging whether the overlapping transmission time length is not greater than a preset time length threshold;

if so, then scaling down target transmit power of the overlapping SC-FDMA symbols in the uplink signal in the current uplink sub-frame or scaling down the target transmit power of all SC-FDMA symbols in a slot including the overlapping SC-FDMA symbols in the uplink signal in the current uplink sub-frame; otherwise, scaling down the target transmit power of all the SC-FDMA symbols of the uplink signal in the current uplink sub-frame;

or if the uplink signals in the current uplink sub-frame include at least two uplink signals and the sum of the target transmit power of the respective uplink signals would exceed the maximum transmit power of the UE, then scaling down the target transmit power of all the SC-FDMA symbols of the uplink signal required to be power scaled in the current uplink sub-frame;

otherwise, for the uplink signal required to be power scaled among the uplink signals, judging whether the number of the overlapping SC-FDMA symbols is not greater than a preset number of SC-FDMA symbols or judging whether the overlapping transmission time length is not greater than a preset time length threshold;

if so, then scaling down target transmit power of the overlapping SC-FDMA symbols in the uplink signal in the current uplink sub-frame or scaling down target transmit power of all SC-FDMA symbols in a slot including the overlapping SC-FDMA symbols in the uplink signal in the current uplink sub-frame; otherwise, scaling down the target transmit power of all the SC-FDMA symbols of the uplink signal in the current uplink sub-frame.

5. The method according to claim 1, wherein scaling down the target transmit power of all or a part of the SC-FDMA symbols of the uplink signal required to be power scaled among the uplink signals in the current uplink sub-frame specifically comprises:

determining an uplink signal with non-zero transmit power and with a lowest priority among the uplink signals in the current uplink sub-frame as the uplink signal required to be power scaled according to priorities of the uplink signals, and then scaling down the target transmit power of all or a part of the SC-FDMA symbols of the uplink signal required to be power scaled by a same scaling factor; or if the uplink signals in the current uplink sub-frame includes a Sounding Reference Signal, SRS, then determining an uplink signal with non-zero transmit power and with a lowest priority other than the SRS among the uplink signals in the current uplink sub-frame as the uplink signal required to be power scaled according to priorities of the uplink signals, scaling down the target transmit power of all or a part of the SC-FDMA symbols of the uplink signal required to be power scaled by a same scaling factor until a sum of target transmit power of other uplink signals than the SRS in the current uplink sub-frame does not exceed maximum transmit power currently available, and scaling down target transmit power of the SRS by a same scaling factor until a sum of transmit power of the SRS and transmit power of uplink signals overlapping with the SRS among the uplink signals in the current uplink sub-frame does not exceed the maximum transmit power currently available, wherein the maximum transmit power currently available is the maximum transmit power of the UE or the maximum transmit power of the UE minus the target transmit power of the PRACH;

wherein the uplink signals in accordance with the priorities from high to low are as follows: a Physical Uplink Control Channel, PUCCH, a Physical Uplink Shared Channel, PUSCH, with Uplink Control Information, UCI, a PUSCH without UCI and an SRS.

6. The method according to claim 1, wherein the uplink signals include a PUCCH and/or a PUSCH and/or an SRS.

7. The method according to claim 1, wherein if the PRACH is transmitted across multiple uplink sub-frames, then transmit power of the PRACH in the respective uplink sub-frame is constant.

8. A User Equipment, UE, comprising:

a first transmit power determination unit to determine target transmit power of uplink signals transmitted on respective synchronized uplink component carriers in a current uplink sub-frame;

a channel judgment unit to judge whether a Physical Random Access Channel, PRACH, is transmitted on an uplink secondary component carrier in the current uplink sub-frame;

a second transmit power determination unit to determine target transmit power of the PRACH when the channel judgment unit judges that the PRACH is transmitted on the uplink secondary component carrier in the current uplink sub-frame;

a transmit power judgment unit to judge whether a sum of the target transmit power of the uplink signals and the target transmit power of the PRACH would exceed maximum transmit power of the UE; and a power control unit to maintain the target transmit power of the PRACH unchanged, and to scale down target transmit power of all or a part of Single Carrier-Frequency Division Multiple Access, SC-FDMA, symbols of an uplink signal required to be power scaled among the uplink signals in the current uplink sub-frame until a sum of transmit power of the uplink signals in the current uplink sub-frame does not exceed the maximum transmit power of the UE minus the target transmit power of the PRACH when the transmit power judgment unit judges that the sum of the target transmit power of the uplink signals and the target transmit power of the PRACH would exceed the maximum transmit power of the UE; wherein, the UE further including:

an overlapping judgment unit configured, when the channel judgment unit judges that no PRACH is transmitted on any uplink secondary component carrier in the current uplink sub-frame and a PRACH is transmitted on an uplink secondary component carrier in a previous adjacent uplink sub-frame of the current uplink sub-frame, to judge whether the uplink signals in the current uplink sub-frame overlap with a preamble sequence carried in the PRACH in the previous adjacent uplink sub-frame, wherein when the overlapping judgment unit judges that the uplink signals in the current uplink sub-frame do not overlap with the preamble sequence carried in the PRACH in the previous adjacent uplink sub-frame, the transmit power judgment unit is further configured to judge whether a sum of the target transmit power of the uplink signals would exceed the maximum transmit power of the UE, when the transmit power judgment unit judges that the sum of the target transmit power of the uplink signals would exceed the maximum transmit power of the UE, the power control unit is further configured to scale down target transmit power of all the SC-FDMA symbols of the uplink signal required to be power scaled among the uplink signals in the current uplink sub-frame until the sum of the transmit power of the uplink signals in the current uplink sub-frame does not exceed the maximum transmit power of the UE, when the transmit power judgment unit judges that the sum of the target transmit power of the uplink signals does not exceed the maximum transmit power of the UE, the transmission unit is further configured to transmit with the target transmit power of the uplink signals, when the overlapping judgment unit judges that the uplink signals in the current uplink sub-frame overlap with the preamble sequence carried in the PRACH in the previous adjacent uplink sub-frame, the second transmit power determination unit is further configured to determine target transmit power of the PRACH in the previous adjacent uplink sub-frame, and the transmit power judgment unit is further configured to judge whether a sum of the target transmit power of the uplink signals in the current uplink sub-frame and the target transmit power of the PRACH in the previous adjacent uplink sub-frame would exceed the maximum transmit power of the UE, when the transmit power judgment unit judges that the sum of the target transmit power of the uplink signals in the current uplink sub-frame and the target transmit power of the PRACH in the previous adjacent uplink sub-frame would exceed the maximum transmit power of the UE, the power control unit is further configured to maintain the target transmit power of the PRACH in the previous adjacent uplink sub-frame unchanged and to scale down target transmit power of all or a part of the SC-FDMA symbols of the uplink signal required to be power scaled among the uplink signals in the current uplink sub-frame until the sum of the transmit power of the uplink signals in the current uplink sub-frame does not exceed the maximum transmit power of the UE minus the target transmit power of the PRACH, and when the transmit power judgment unit judges that the sum of the target transmit power of the uplink signals in the current uplink sub-frame and the target transmit power of the PRACH in the previous adjacent uplink sub-frame does not exceed the maximum transmit power of the UE, the transmission unit is configured to transmit with the target transmit power of the uplink signals;

wherein the power control unit is specifically configured:

for the uplink signal required to be power scaled among the uplink signals, to scale down target transmit power of SC-FDMA symbols, overlapping with a preamble sequence carried in the PRACH, in the uplink signal in the current uplink sub-frame, or to scale down target transmit power of all SC-FDMA symbols in a slot including SC-FDMA symbols, overlapping with the preamble sequence carried in the PRACH, in the uplink signal in the current uplink sub-frame, wherein the overlapping SC-FDMA symbols include SC-FDMA symbols, overlapping with the preamble sequence carried in the PRACH in the current uplink sub-frame or a previous adjacent uplink sub-frame, in the uplink signal; or if the uplink signals include at least two uplink signals and the sum of the target transmit power of the respective uplink signals does not exceed the maximum transmit power of the UE, then for the uplink signal required to be power scaled among the uplink signals, to scale down target transmit power of SC-FDMA symbols, overlapping with a preamble sequence carried in the PRACH, in the uplink signal in the current uplink sub-frame, or to scale down target transmit power of all SC-FDMA symbols in a slot including SC-FDMA symbols, overlapping with the preamble sequence carried in the PRACH, in the uplink signal in the current uplink sub-frame, wherein the overlapping SC-FDMA symbols include SC-FDMA symbols, overlapping with the preamble sequence carried in the PRACH in the current uplink sub-frame or a previous adjacent uplink sub-frame, in the uplink signal; otherwise, for the uplink signal required to be power scaled among the uplink signals, to scale down target transmit power of all the SC-FDMA symbols of the uplink signal in the current uplink sub-frame; or for the uplink signal required to be power scaled among the uplink signals, to scale down the target transmit power of all or a part of the SC-FDMA symbols of the uplink signal according to the number of SC-FDMA symbols, overlapping with a preamble sequence carried in the PRACH, in the uplink signal in the current uplink sub-frame or a transmission time length of the uplink signal, overlapping with the preamble sequence carried in the PRACH, in the current uplink sub-frame, wherein the overlapping SC-FDMA symbols or the overlapping transmission time include or includes SC-FDMA symbols or transmission time, overlapping with the preamble sequence carried in the PRACH in the current uplink sub-frame or a previous adjacent uplink sub-frame, in the uplink signal.

9. The UE according to claim 8, further comprising:

a transmission unit configured to transmit with the target transmit power of the uplink signals and the target transmit power of the PRACH when the transmit power judgment unit judges that the sum of the target transmit power of the uplink signals and the target transmit power of the PRACH does not exceed the maximum transmit power of the UE.

10. The UE according to claim 8, wherein when the power control unit is further configured to maintain the target transmit power of the PRACH in the previous adjacent uplink sub-frame unchanged and to scale down the target transmit power of a part of the SC-FDMA symbols of the uplink signal required to be power scaled among the uplink signals in the current uplink sub-frame, the power control unit is specifically configured:

for the uplink signal required to be power scaled among the uplink signals, to scale down target transmit power of SC-FDMA symbols, overlapping with the preamble sequence carried in the PRACH, in the uplink signal in the current uplink sub-frame, or to scale down target transmit power of all SC-FDMA symbols in a slot including SC-FDMA symbols, overlapping with the preamble sequence carried in the PRACH, in the uplink signal in the current uplink sub-frame; or if the uplink signals include at least two uplink signals and the sum of the target transmit power of the respective uplink signals does not exceed the maximum transmit power of the UE, then for the uplink signal required to be power scaled among the uplink signals, to scale down target transmit power of SC-FDMA symbols, overlapping with the preamble sequence carried in the PRACH, in the uplink signal in the current uplink sub-frame, or to scale down target transmit power of all SC-FDMA symbols in a slot including SC-FDMA symbols, overlapping with the preamble sequence carried in the PRACH, in the uplink signal in the current uplink sub-frame; otherwise, for the uplink signal required to be power scaled among the uplink signals, to scale down target transmit power of all the SC-FDMA symbols of the uplink signal in the current uplink sub-frame.

11. The UE according to claim 8, wherein the power control unit is further configured:

to judge whether the number of the overlapping SC-FDMA symbols is not greater than a preset number of SC-FDMA symbols or to judge whether the overlapping transmission time length is not greater than a preset time length threshold;

if so, to scale down target transmit power of the overlapping SC-FDMA symbols in the uplink signal in the current uplink sub-frame or scaling down target transmit power of all SC-FDMA symbols in a slot including the overlapping SC-FDMA symbols in the uplink signal in the current uplink sub-frame; otherwise, to scale down the target transmit power of all the SC-FDMA symbols of the uplink signal in the current uplink sub-frame;

or if the uplink signals in the current uplink sub-frame include at least two uplink signals and the sum of the target transmit power of the respective uplink signals would exceed the maximum transmit power of the UE, to scale down the target transmit power of all the SC-FDMA symbols of the uplink signal required to be power scaled in the current uplink sub-frame;

otherwise, for the uplink signal required to be power scaled among the uplink signals, to judge whether the number of the overlapping SC-FDMA symbols is not greater than a preset number of SC-FDMA symbols or to judge whether the overlapping transmission time length is not greater than a preset time length threshold;

if so, to scale down target transmit power of the overlapping SC-FDMA symbols in the uplink signal in the current uplink sub-frame or to scale down target transmit power of all SC-FDMA symbols in a slot including the overlapping SC-FDMA symbols in the uplink signal in the current uplink sub-frame; otherwise, to scale down the target transmit power of all the SC-FDMA symbols of the uplink signal in the current uplink sub-frame.

12. The UE according to claim 8, wherein the power control unit is specifically configured:

to determine an uplink signal with non-zero transmit power and with a lowest priority among the uplink signals in the current uplink sub-frame as the uplink signal required to be power scaled according to priorities of the uplink signals and to scale down the target transmit power of all or a part of the SC-FDMA symbols of the uplink signal required to be power scaled by a same scaling factor; or if the uplink signals in the current uplink sub-frame includes a Sounding Reference Signal, SRS, to determine an uplink signal with non-zero transmit power and with a lowest priority other than the SRS among the uplink signals in the current uplink sub-frame as the uplink signal required to be power scaled according to priorities of the uplink signals, to scale down the target transmit power of all or a part of the SC-FDMA symbols of the uplink signal required to be power scaled by a same scaling factor until a sum of target transmit power of other uplink signals than the SRS in the current uplink sub-frame does not exceed maximum transmit power currently available, and to scale down target transmit power of the SRS by a same scaling factor until a sum of transmit power of the SRS and transmit power of uplink signals overlapping with the SRS among the uplink signals in the current uplink sub-frame does not exceed the maximum transmit power currently available, wherein the maximum transmit power currently available is the maximum transmit power of the UE or the maximum transmit power of the UE minus the target transmit power of the PRACH;

wherein the uplink signals in accordance with the priorities from high to low are as follows: a Physical Uplink Control Channel, PUCCH, a Physical Uplink Shared Channel, PUSCH, with Uplink Control Information, UCI, a PUSCH without UCI and an SRS.

13. The UE according to claim 8, wherein the uplink signals include a PUCCH and/or a PUSCH and/or an SRS.

14. The UE according to claim 8, wherein if the PRACH is transmitted across multiple uplink sub-frames, then transmit power of the PRACH in the respective uplink sub-frame is constant.

\* \* \* \* \*